Figure 1:
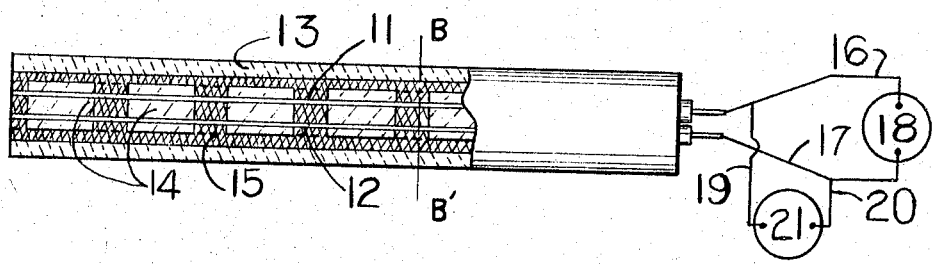

March 7, 1967

G. S. BACHMAN 3,307,401

ELEMENT FOR MEASUREMENT OF FURNACE
WALL THICKNESS AND TEMPERATURE
Filed May 24, 1965

INVENTOR.
George S. Bachman

United States Patent Office 3,307,401
Patented Mar. 7, 1967

3,307,401
ELEMENT FOR MEASUREMENT OF FURNACE
WALL THICKNESS AND TEMPERATURE
George S. Bachman, Edison Township, N.J.
(Redfield Village 16B-3, Metuchen, N.J. 08840)
Filed May 24, 1965, Ser. No. 458,359
6 Claims. (Cl. 73—359)

This invention relates to a novel system for the measurement of furnace wall thickness and temperature, and more particularly to novel elements which are inserted into and through refractory walls and which have the ability to indicate wall thickness and temperature. The term "furnace" is meant to include all enclosures operating at high temperatures, including roofs and bottoms in the term "furnace wall."

This is a continuation-in-part of my copending patent application Serial No. 337,211, filed January 13, 1964, now abandoned.

In many furnaces the refractory walls are gradually eroded away with use until they become so thin that the furnace must cease operations so that a wall can be replaced or repaired before it collapses and causes damage. Therefore it is important to know the wall thickness on a continuing basis so that the furnace may cease operations at the most suitable time.

In many furnaces, ladles, pots, etc., the temperature at or near the hot surface of a wall or roof provides a valuable regulatory guide or a directly-connected sensing means for controlling the processes of the furnace chamber. The use of a wire thermocouple inserted into a furnace wall so that the hot junction of the thermocouple is located at or near the hot surface of the wall provides such a means for measuring and controlling furnace temperature. However, as the wall is eroded away, the hot junction of the commonly employed thermocouple is destroyed and the thermocouple thereby rendered inoperative.

It is an object of the present invention, therefore, to provide an element suitable for insertion in a refractory wall and capable of measuring wall temperature on a continuous basis throughout the working life of the wall as both element and wall are gradually eroded away.

Another object of the present invention is to provide an element suitable for insertion through a refractory wall and capable of indicating, by means of measurements of electrical resistance, the thickness of the remaining wall.

Another object of the invention is to provide an element suitable for positioning in a furnace wall, and which provides information concerning wall temperature by means of its thermoelectric voltage output, and which provides information concerning wall thickness by means of its electrical resistance.

The objects of the invention are attained by an element, corresponding in length to the thickness of the furnace wall into which it is inserted, and which consists of two parallel, spaced wires of dissimilar composition, these wires being separated from each other by electrically insulating material for several portions of their length, and separated by electrically semiconductive material for the several remaining portions of their length. The insulating and semiconductive portions alternate in location along the wires, and can be quite numerous. A protection tube or protective sheath normally encloses the wires and the materials separating them.

The electrical conductivity of the material comprising the insulating portions of the element is negligible at all temperatures to which the element or any portion thereof is subjected. Magnesia, alumina, beryllia, mullite, silica, and other materials which like them possess high electrical resistivity at elevated temperatures, are suitable for use as the insulating material between the two wires.

In one form of the invention, the electrically insulating material is in the form of round double-bore insulators through which the wires pass. The insulators serve to keep the wires separated but in parallel alignment. The insulators are available from commercial sources in many different diameters, hole sizes, and lengths. Double-hole swageable insulators of fused magnesia or fused alumina are particularly suitable, because recesses can readily be made in the ends of these insulators to accommodate insertions of semiconductive material.

The semiconductive material of the element of the present invention is defined as essentially an electrically insulating material at low temperatures and an electrically conducting material at high temperatures, with intermediate conductivities at intermediate temperatures. In an element of the present invention located in the wall of a furnace in operation, the portion of the element near the inside face of the furnace wall is at a high temperature, while the portion of the element near the outer face of the wall is normally at a much lower temperature. Certain oxides, mixtures of oxides, and other compositions are suitable for use as the semiconductive material of the present invention. I preferably employ titania or stabilized zirconia. Compounds or mixtures of zirconia and ceria, magnesia and nickel oxide, titania and silica, and titania and alumina, etc., are also suitable. This listing of suitable semiconductive materials is illustrative rather than exhaustive.

A given material may be classified as either insulating or semiconducting, depending on the temperature range in which the element of the present invention is used. For example, alumina, which is an insulator in normal use, can be used as a semiconductive material at extremely high temperatures.

The semiconductive material must be in intimate electrical contact with each wire. One method of manufacture is to distribute finely divided material of the desired composition around each of the wires and in the space between them, and then to sinter this material at a high temperature to form a rigid body. This sintering process may be performed in the wall of the furnace while the element is in use and by the heat of the furnace itself, or it may be performed as a separate manufacturing operation. In either case, in the element in use, sintered semiconductive material is in intimate contact with the wires of the element and, where at a sufficiently high temperature, constitutes an electrically conducting bridge between the wires.

In one form of the present invention, the semiconductive material fills recesses in the ends of insulators. This form of the invention affords certain manufacturing advantages because the insulators can be strung end-to-end on the wires, and the recesses then filled with semiconductive material.

Wires of platinum and platinum alloys are suitable for use in the element since they are chemically inert and withstand high temperatures. A satisfactory combination is one wire of platinum and the other wire of a platinum-rhodium alloy. The invention is in no way limited to the use of these metals, however. Several wires of smaller diameter may be substituted for each of the two thermocouple wires of the element in order to increase contact between wires and semiconductive material.

Optionally, the two wires of the element may be joined together at their hot ends to form a metallic junction. Although this junction is normally soon eroded away when the element is in use, it does enable the element to be used as a pyrometer at low temperatures, such as the initial heat-up period of a furnace.

Also optionally, the two wires of the element may be joined together at their hot ends by means of a short wire of a metal whose melting point is somewhat lower than that of either of the two wires of the element. For example, a short wire of palladium is used to join a platinum wire to a wire of platinum-rhodium alloy. The element can then be used as a pyrometer at relatively low temperatures, such as the initial heat-up period of a furnace. When the temperature at the hot end of the element exceeds 2829° F., the melting point of palladium, the palladium wire melts at a temperature and time easily anticipated and readily observable on the cart recording of furnace temperature. After the palladium wire melts, the element continues operating as a pyrometer by using its junctions of semiconductive material.

For measurement of temperature, the element is connected by means of temperature-compensating lead wires to a null potentiometer or to an instrument of the millivoltmeter type, which measures the electromotive force output generated by the element when it is heated. This voltage output is translated to terms of temperature by the means commonly employed with thermocouples.

The semiconductive sections provide low-resistance hot junctions between the two wires when the sections are at sufficiently high temperatures. When the element is in use, the semiconductive sections are different in temperature and therefore in electrical resistance, depending on their position in the element. The semiconductive section closest to the hot face of the furnace wall is at the highest temperature and therefore has the lowest electrical resistance, the next semiconductive section in line has the second-lowest resistance, and so on. When the semiconductive sections are of suitable material and are properly spaced, the voltage generated by an element of the present invention provides a measurement of the temperature prevailing at the hot end of the element, and in particular the element measures accurately and speedily the changes of temperature which take place at the hot end of the element.

The total electrical resistance of the element is the sum of the resistances of the wires of the element plus the resistance of the materials between the wires. The materials between the wires and the metals and diameters of the wires themselves are chosen such that, when the element is at full operating temperature, the combined electrical resistance of the wires is the greater part of the total resistance of the element. As the element is gradually worn away and shortened in use, the wires of the element are likewise worn away and shortened. The electrical resistance of the element therefore gradually decreases as the element gradually decreases in length. In this way the resistance of the element is a measure of its length on a continuing basis, while the length of the element measures the thickness of the furnace wall in which the element is located.

For measurement of furnace wall thickness, the element is connected to an ohmmeter which measures the electrical resistance of the element.

Where it is desired to measure wall thickness only, the wires of the two branches of the element need not be dissimilar in composition since the resistance measurements can be made just as easily when wires of the same composition are used. However, if the element is to be used as a pyrometer as well, the use of dissimilar metal is essential because the thermoelectric voltage effect depends on the use of wires of dissimilar composition in the two branches of the thermocouple.

Figure 2:
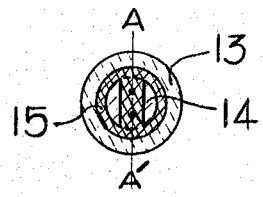

FIGURE 1 is a longitudinal cross-sectional view of an element made according to the present invention for installation in a furnace wall. The two spaced-apart dissimilar wires 11 and 12 are surrounded by a protection tube of circular cross-section 13. The two wires are separated from each other by alternating sections of insulating material 14 and semiconductive material 15. Wires 11 and 12 are connected by means of wires 16 and 17 to a potentiometer 18 which measures the voltage output of the element. Wires 11 and 12 are connected by means of wires 19 and 20 to an ohmmeter 21 which measures the electrical resistance of the element. FIGURE 2 is a lateral cross-sectional view of the element.

As the furnace wall gradually wears away, the wires, protection tube, and insulating and semiconductive materials of the element are also gradually worn away. It is clear from an inspection of FIGURES 1 and 2 that the progressive removal of these items does not destroy the ability of the element to complete a resistive circuit or to generate a thermoelectric voltage indicative of the temperature of the element at its hot end. This ability continues as long as there is any semiconductive material at a suitably elevated temperature between, and in contact with, the two dissimilar wires to serve as an electrically conducting bridge between them.

The features and principles underlying the invention described above in connection with specific exemplifications thereof will suggest to those skilled in the art many other modifications thereof. It is accordingly desired that the appended claims shall not be limited to any specific features or details thereof.

I claim as my invention:

1. An element capable of measuring temperature, wall thickness, or both temperature and wall thickness, and adapted for use in refractory walls, roofs, and bottoms, comprising
   a refractory sheath,
   spaced conductor elements of different materials running longitudinally through said sheath, and,
   spacing materials between said conductor elements, said spacing materials comprising alternate sections of insulating material and semiconductive material, said semiconductive material being in intimate electrical contact with said conductor elements.

2. The element set forth in claim 1 wherein the insulating material is a member of the group consisting of magnesia, alumina, beryllia, mullite, and silica.

3. The element set forth in claim 1 wherein the semiconductive material is a member of the group consisting of titania and stabilized zirconia.

4. A method of measuring the temperature of a refractory wall, roof, or bottom, with an element comprising a refractory sheath, spaced conductor elements of different materials running longitudinally through said sheath, and spacing materials between said conductor elements, said spacing materials comprising alternate sections of insulating material and semiconductive material, said semiconductive material being in intimate electrical contact with said conductor elements which comprises inserting the element into the wall, roof, or bottom, raising the temperature such that the element is gradually worn away, and measuring the electromotive force output of the element.

5. An element suitable for use in refractory walls, roofs, and bottoms, for the measurement of temperature, wall thickness, or both temperature and wall thickness, comprising
   spaced conductor elements of different materials extending side by side, and,
   spacing materials between said conductor elements, said spacing materials comprising alternate sections of electrically insulating material and semiconductive material, said semiconductive material being in intimate electrical contact with said conductor elements.

6. An element suitable for use in refractory walls, roofs and bottoms, for measurement of wall thickness and temperature, said element comprising,
a refractory sheath,
a pair of spaced conductor elements of different materials extending side by side through said sheath,
means maintaining said conductor elements in spaced relationship to each other including
electrically semi-conducting material in intimate contact with and extending between said conductor elements.

References Cited by the Examiner
UNITED STATES PATENTS

| | | | |
|---|---|---|---|
| 1,660,504 | 2/1928 | Grub | 136—4 |
| 1,887,827 | 10/1932 | Vehling | 73—359 |
| 2,258,809 | 10/1941 | Craig | 73—86 X |
| 2,915,305 | 12/1959 | Craig | 73—86 X |
| 3,078,707 | 2/1963 | Weaver | 73—7 |

LOUIS R. PRINCE, *Primary Examiner.*

S. C. SWISHER, *Assistant Examiner.*